(12) United States Patent
Ito et al.

(10) Patent No.: US 10,569,190 B2
(45) Date of Patent: Feb. 25, 2020

(54) PACKED COLUMN

(71) Applicant: TAIYO NIPPON SANSO CORPORATION, Tokyo (JP)

(72) Inventors: Takeyuki Ito, Tokyo (JP); Nobuaki Egoshi, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 0 days.

(21) Appl. No.: 15/762,787

(22) PCT Filed: Mar. 3, 2017

(86) PCT No.: PCT/JP2017/008554
§ 371 (c)(1),
(2) Date: Mar. 23, 2018

(87) PCT Pub. No.: WO2017/169512
PCT Pub. Date: Oct. 5, 2017

(65) Prior Publication Data
US 2018/0257001 A1 Sep. 13, 2018

(30) Foreign Application Priority Data
Mar. 28, 2016 (JP) .................. 2016-063977

(51) Int. Cl.
*B01D 3/14* (2006.01)
*B01D 3/26* (2006.01)
(Continued)

(52) U.S. Cl.
CPC ............. *B01D 3/26* (2013.01); *B01D 3/008* (2013.01); *B01D 3/346* (2013.01); *F25J 3/044* (2013.01);
(Continued)

(58) Field of Classification Search
CPC .... B01D 3/16; B01D 3/26; B01J 19/30; B01J 19/305; B01J 19/32
(Continued)

(56) References Cited

U.S. PATENT DOCUMENTS 3,796,657 A * 3/1974 Pretorius ............ B01D 11/0242
210/635
4,432,913 A * 2/1984 Harper .................. B01D 3/20
239/193
(Continued)

FOREIGN PATENT DOCUMENTS

JP 06-079103 A 3/1994
JP 07-091825 A 4/1995
(Continued)

OTHER PUBLICATIONS

International Search Report dated May 30, 2017, issued for PCT/JP2017/008554.
(Continued)

*Primary Examiner* — Jonathan Luke Pilcher
(74) *Attorney, Agent, or Firm* — Locke Lord LLP

(57) ABSTRACT

Provided is a packed column capable of achieving sufficiently high distillation performance even with the height of its gas-liquid contactors reduced. The packed column is a packed column which includes a gas-liquid contactor 17, 18 inside a tubular body 16 and a liquid distributor 19 in the upper most portion and causes descending liquid and ascending gas to contact each other in the gas-liquid contactor. The operation pressure is in the range of 200 to 1500 kPaG. The relative volatility is in the range of 1.9 to 3.1. The gas-liquid contactor is vertically divided into at least two parts. A gas disperser 20 is provided at at least one position between a lower one of the gas-liquid contactors and an upper one of the gas-liquid contactors, the gas disperser uniformly dispersing the composition of the ascending gas
(Continued)

rising from the lower gas-liquid contactor toward the upper gas-liquid contactor.

4 Claims, 14 Drawing Sheets

(51) Int. Cl.
| | | |
|---|---|---|
| *B01D 3/32* | (2006.01) | |
| *B01D 3/20* | (2006.01) | |
| *F25J 3/04* | (2006.01) | |
| *B01D 3/00* | (2006.01) | |
| *B01D 3/34* | (2006.01) | |
| *B01J 19/32* | (2006.01) | |

(52) U.S. Cl.
CPC ....... *F25J 3/04284* (2013.01); *F25J 3/04848* (2013.01); *F25J 3/04909* (2013.01); *F25J 3/04927* (2013.01); *B01D 3/14* (2013.01); *B01D 3/20* (2013.01); *B01D 3/32* (2013.01); *B01J 19/32* (2013.01); *F25J 2200/72* (2013.01)

(58) Field of Classification Search
USPC ............... 261/94, 95, 96, 97, 146, 147, 148; 62/643
See application file for complete search history.

(56) References Cited

U.S. PATENT DOCUMENTS

| | | | | |
|---|---|---|---|---|
| 4,689,183 | A * | 8/1987 | Helms .................... | B01D 3/008 261/97 |
| 5,132,055 | A | 7/1992 | Alleaume et al. | |
| 6,128,922 | A | 10/2000 | Dean et al. | |
| 6,286,818 | B1 * | 9/2001 | Buhlmann ............... | B01J 19/30 261/110 |
| 6,475,349 | B1 * | 11/2002 | McKeigue ............. | B01D 3/008 159/43.1 |
| 9,637,593 | B2 * | 5/2017 | Seavey .................. | B01D 3/143 |
| 2002/0050657 | A1 * | 5/2002 | Werlen .................... | B01J 19/32 261/94 |
| 2012/0279082 | A1 * | 11/2012 | Seavey .................. | B01D 3/143 34/505 |
| 2013/0139569 | A1 * | 6/2013 | Alix ........................ | B01D 3/26 73/31.04 |
| 2016/0159978 | A1 * | 6/2016 | Seavey .................. | B01D 3/143 568/621 |

FOREIGN PATENT DOCUMENTS

| | | |
|---|---|---|
| JP | 2000-249464 A | 9/2000 |
| JP | 2000-337766 A | 12/2000 |

OTHER PUBLICATIONS

Supplementary European Search Report dated Nov. 6, 2019, issued for the European patent application No. 17774057.8.

* cited by examiner

PACKED COLUMN

TECHNICAL FIELD

The present invention relates to a packed column and relates in particular to a packed column suitable for distillation operations in cryogenic air separation unit.

BACKGROUND ART

FIG. 15 is a system diagram illustrating the basic configuration of a nitrogen generator that distills from air as a raw material through cryogenic separation. This nitrogen generator 100 includes a distillation column 101 in which an upper liquid distributor 102, an upper gas-liquid contactor 103, an intermediate liquid distributor 104, and a lower gas-liquid contactor 105 are disposed in this order from the top. The upper gas-liquid contactor 103 and the lower gas-liquid contactor 105 are typically contactors using structured packing.

In a case of using this nitrogen generator 100 to distill nitrogen gas of 700 kPaG (gauge pressure; the same applies below) as a product, air as a raw material is compressed by an air compressor 106 to 760 kPaG. The heat of compression generated by the compression of the air is removed by an aftercooler 107, so that the compressed air is cooled to 40° C. Then, the carbon dioxide, water, and hydrocarbons contained in the air are removed through adsorption by a pre-treatment unit 108 that alternately uses two adsorbers, so that the air becomes purified air.

The purified air after exiting the pre-treatment unit 108 is introduced into a cold box 110 through a purified air stream 109 and cooled to −165° C., which is near the dew point, by a main heat exchanger 111. The cooled purified air is then introduced into a lower portion of the distillation column 101 through a gas introduction stream 112 as ascending gas in the distillation column 101. Nitrogen gas in an upper portion of the distillation column 101 separated by distillation operations inside the column is drawn to a gas discharge stream 113 at the top of the column. Part of the nitrogen gas branches off into a condensation stream 114 and is introduced into a condenser 115.

Meanwhile, at the bottom of the distillation column 101, oxygen-enriched liquid air is separated by the distillation, drawn into a liquid discharge stream 116, and lowered in pressure to 300 kPaG by a liquid-air pressure reducing valve 117, so that the temperature drops to −180° C. due to the Joule-Thomson effect. This low-temperature liquid air is introduced into the condenser 115 and exchanges heat with the above-mentioned nitrogen gas. Consequently, the nitrogen gas is liquefied and the whole low-temperature liquid air is vaporized into low-temperature air. The liquid nitrogen liquefied at the condenser 115 is introduced into the upper portion of the distillation column 101 through a liquid introduction stream 118 as descending liquid in the distillation column 101.

The low-temperature air vaporized at the condenser 115 is introduced into the main heat exchanger 111 through a low-temperature air stream 119, exchanges heat with the purified air to be heated to −140° C., and is drawn in this intermediate temperature state into a turbine inlet stream 120 from an intermediate portion of the main heat exchanger 111. The low-temperature air in the intermediate temperature state is introduced into an expansion turbine 121, in which the low-temperature air is expanded to 30 kPaG and its temperature is lowered to −170° C. by adiabatic expansion. The low-temperature air lowered in temperature by the expansion turbine 121 is introduced into the main heat exchanger 111 again through a turbine outlet stream 122 and exchanges heat with the purified air to cool the purified air. Consequently, the low-temperature air is sufficiently warmed to a temperature that is several ° C. lower than the purified air, and then discharged from the cold box 110 through a waste gas stream 123.

Also, the remaining portion of the nitrogen gas discharged into the gas discharge stream 113 from the distillation column 101 is introduced into the main heat exchanger 111. Then, as in the low-temperature air, the remaining portion of the nitrogen gas exchanges heat with the purified air to be sufficiently warmed to a temperature several ° C. lower than the purified air. Thereafter, the remaining portion of the nitrogen gas is discharged from the cold box 110 through a product nitrogen gas stream 124 and collected as a product nitrogen gas. In the case of distilling a product nitrogen gas at a pressure of 700 kPaG as described above, the distillation column 101 is operated at a high pressure of 730 kPaG.

In the distillation column 101, the liquid nitrogen introduced into the distillation column 101 from the condenser 115 through the liquid introduction stream 118 is distributed uniformly in the cross-sectional direction of the packed column 101 by the upper liquid distributor 102 and then flows down toward the upper gas-liquid contactor 103. The descending liquid flowing down from the lower end of the upper gas-liquid contactor 103 is distributed uniformly in the cross-sectional direction of the packed column 101 again by the intermediate liquid distributor 104 and then flows down toward the lower gas-liquid contactor 105. This is done so that the flow rate and composition of the descending liquid flowing down inside the upper gas-liquid contactor 103 and the lower gas-liquid contactor 105 while being in gas-liquid contact with the ascending gas, can be uniform.

Meanwhile, a configuration like a distillation column 131 illustrated in FIG. 16 is sometimes adopted in which a single liquid distributor 133 is disposed above a single gas-liquid contactor 132. However, widely used is a packed column 139 in which a gas-liquid contactor is divided vertically into a plurality of parts, for example, divided vertically into two gas-liquid contactors 135, 136, and an upper liquid distributor 137 and a intermediate liquid distributor 138 are provided respectively above the gas-liquid contactors 135, 136, as illustrated in FIG. 17 (see Patent Literature 1, for example).

CITATION LIST

Patent Literature

[Patent Literature 1] Japanese Patent Application Publication No. 2000-337766

SUMMARY OF INVENTION

Technical Problems

In a packed column operated at relatively low pressure, such as a packed column operated at 10 to 50 kPaG like a crude argon column in a cryogenic air separation unit, the relative volatility is 1.4 to 1.5, which is relative low, and the operating line and the equilibrium line in distillation is close to each other. It is therefore known that if small liquid maldistribution occurs, the operating line and the equilibrium line get closer to each other, thereby deteriorating the distillation performance (separation performance). To prevent maldistribution of the descending liquid, intermediate liquid distributors are placed at regular intervals, as illustrated in FIG. 17.

On the other hand, in a packed column operated at relatively high pressure, such as the one in the above-described nitrogen generator, the operating line and the equilibrium line are relatively far from each other in distillation in which the relative volatility is 1.9 to 3.1, that is, the operation pressure is 200 to 1500 kPaG. Thus, the direct influence of liquid maldistribution on deterioration in distillation performance is small. Despite that, there are cases where the distillation performance is still deteriorated when the packed column is used, even with intermediate liquid distributors placed therein.

No adequate solution to this problem has been developed. Currently, the problem is handled by simply increasing the height of the gas-liquid contactors in the packed column or increasing the amount of feed air. However, increasing the amount of the feed air results in increased power consumption at the air compressor. Also, increasing the height of the gas-liquid contactors increases not only the size of the distillation column but also the size of the cold box, which leads to a problem of an increased apparatus cost.

These problems occur not only with nitrogen generator but also with the high-pressure column (lower column) of cryogenic air separation unit by a double column system, which additionally generate oxygen and argon.

In view of this, an object of the present invention is to provide a packed column that is operated at relatively high pressure and prevent deterioration in distillation performance without having to increase the height of its gas-liquid contactors or increase the amount of air.

Solution to Problems

To achieve the above object, a packed column of the present invention a packed column which includes a gas-liquid contactor inside a tubular body and a liquid distributor in an uppermost portion and causes descending liquid and ascending gas to contact each other in the gas-liquid contactor, characterized in that operation pressure is in a range of 200 to 1500 kPaG, relative volatility is in a range of 1.9 to 3.1, the gas-liquid contactor is vertically divided into at least two parts to thereby form a plurality of gas-liquid contactors, and a gas disperser is provided at least one position between a lower one of the gas-liquid contactors and an upper one of the gas-liquid contactors, the gas disperser uniformly dispersing composition of the ascending gas rising from the lower gas-liquid contactor toward the upper gas-liquid contactor.

Further, the packed column of the present invention is characterized in that a total height of the gas-liquid contactors above the highest gas disperser may be set such that a ratio of the total height to a height of all the gas-liquid contactors is 0.5 or greater.

Also, the packed column of the present invention is characterized in that the packed column may further comprise at least one intermediate liquid distributor that distributes the descending liquid again, and further in that in the case where the intermediate liquid distributor is provided, a total height of the gas-liquid contactors above the highest gas disperser may also be set such that a ratio of the total height to a height of all the gas-liquid contactors is 0.5 or greater.

In addition, the packed column of the present invention is characterized in that the gas disperser may be formed integrally with the intermediate liquid distributor. Moreover, the packed column of the present invention is characterized in that the gas-liquid contactors may have a structure in which the descending liquid becomes maldistributed as the descending liquid descends.

Advantageous Effect(s) of Invention

According to the packed column of the present invention, the ascending gas rising toward a gas-liquid contactor can be dispersed by the gas disperser. In this way, the composition of the ascending gas can be uniformed, and the flow rate of the ascending gas can be uniformed as well. Thus, decrease in distillation efficiency and gas-liquid contact efficiency can be suppressed. It is therefore possible to reduce the height of the gas-liquid contactors and reduce the amount of gas and liquid to be introduced.

DESCRIPTION OF EMBODIMENTS

Figure 1:
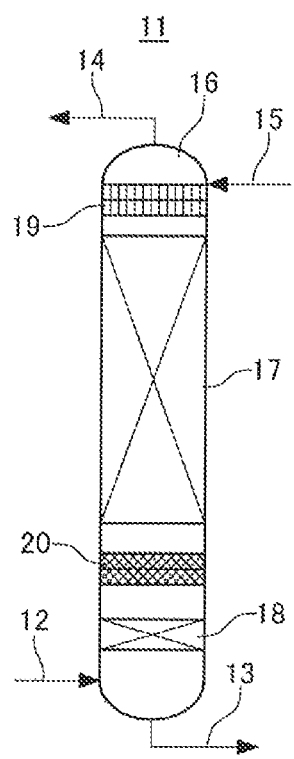
FIG. 1 is an explanatory diagram illustrating a first embodiment of a packed column of the present invention.

FIG. 1 illustrates a first embodiment a packed column of the present invention. This packed column 11 is a packed column with a gas-liquid contactor provided inside a tubular body 16 including a gas introduction portion 12 and a liquid discharge portion 13 at the bottom and including a gas discharge portion 14 and a liquid introduction portion 15 at the top. The gas-liquid contactor in the tubular body 16 is formed into vertically divided upper gas-liquid contactor 17 and lower gas-liquid contactor 18. Above the upper gas-liquid contactor 17, a liquid distributor 19 is provided which causes liquid introduced from the liquid introduction portion 15 to flow down uniformly toward the upper gas-liquid contactor 17. Between the upper gas-liquid contactor 17 and the lower gas-liquid contactor 18, a gas disperser 20 is provided which uniformly disperses the composition of ascending gas rising from the lower gas-liquid contactor 18 toward the upper gas-liquid contactor 17.

The ascending gas introduced from the gas introduction portion 12 is subjected to a distillation operation in the lower gas-liquid contactor 18, introduced into the gas disperser 20 to be dispersed, introduced into the upper gas-liquid contactor 17 to be subjected to a distillation operation, and then discharged from the gas discharge portion 14. On the other hand, the descending liquid introduced from the liquid introduction portion 15 is distributed by the liquid distributor 19 and introduced into the upper gas-liquid contactor 17 and the lower gas-liquid contactor 18 in this order. The liquid thus introduced becomes maldistributed as it descends, and is discharged from the liquid discharge portion 13.

Figure 2:
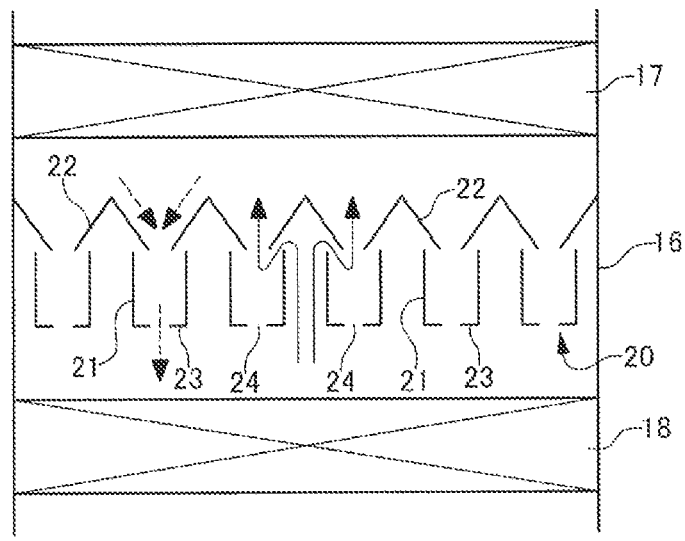
FIG. 2 is a schematic cross-sectional view illustrating an example of a gas disperser.
Figure 3:
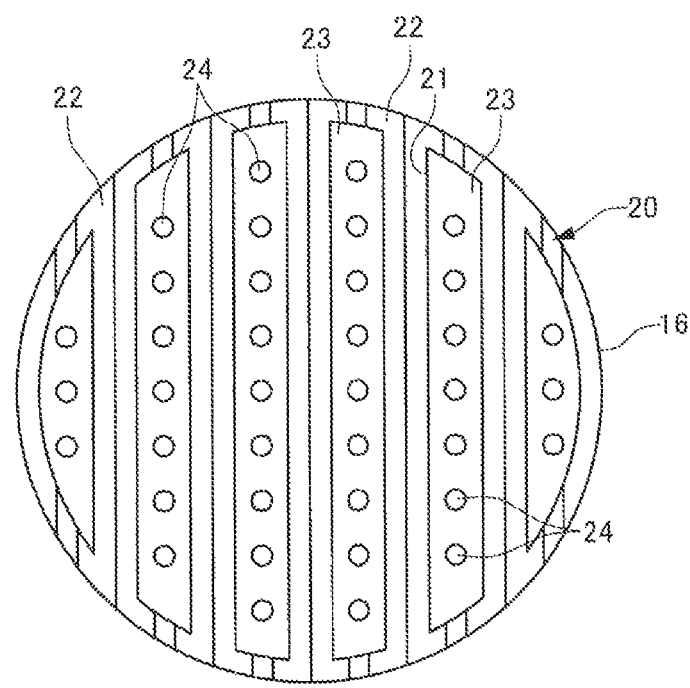
FIG. 3 is a schematic bottom view of the same.

FIG. 2 is a schematic cross-sectional view illustrating an example of the gas disperser 20, and FIG. 3 is a schematic bottom view of the same. In this gas disperser 20, the ascending gas rising from the lower gas-liquid contactor 18 passes through a plurality of paths 21 and resisted by turn back portions 22, so that its composition becomes even horizontally. The ascending gas flowing from the gas disperser 20 into the upper gas-liquid contactor 17 is introduced thereinto such that its flow rate has a distribution dependant on the maldistribution of the descending liquid flowing down in the upper gas-liquid contactor 17. Also, the descending liquid flowing down out of the upper gas-liquid contactor 17 flows down into liquid receiving portions 23 from the upper sides of the turn back portions 22 and then flows down through bottom holes 24 toward the lower gas-liquid contactor 18.

Figure 4:
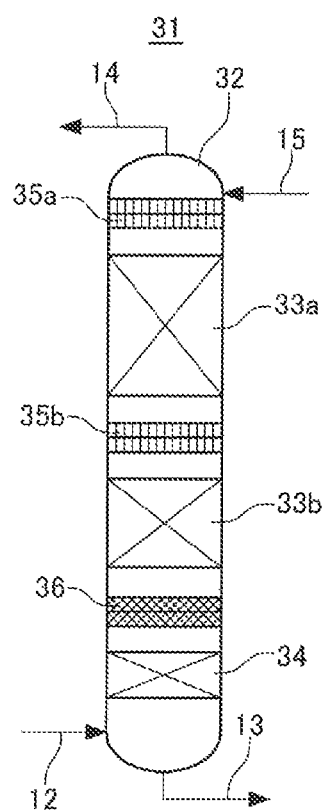
FIG. 4 is an explanatory diagram illustrating a second embodiment of the packed column of the present invention.

FIG. 4 illustrates a second embodiment of the packed column of the present invention. Note that in the following description, identical constituent elements to the constituent elements of the packed column presented in the first embodiment will be denoted by the identical reference signs, and detailed description thereof will be omitted.

In this packed column 31, a gas-liquid contactor in a tubular body 32 is formed into three vertically divided upper gas-liquid contactor 33a, intermediate gas-liquid contactor 33b, and lower gas-liquid contactor 34. An upper liquid distributor 35a is provided above the upper gas-liquid contactor 33a, an intermediate liquid distributor 35b is provided between the upper gas-liquid contactor 33a and the intermediate gas-liquid contactor 33b, and a gas disperser 36 is provided between the intermediate gas-liquid contactor 33b and the lower gas-liquid contactor 34.

Ascending gas introduced into a lower portion of the packed column 31 from the gas introduction portion 12 is subjected to a distillation operation in the lower gas-liquid contactor 34, introduced into the gas disperser 36 to be dispersed, introduced into the intermediate gas-liquid contactor 33b and the upper gas-liquid contactor 33a in this order to be subjected to distillation operations, and then discharged from the gas discharge portion 14. On the other hand, descending liquid introduced from the liquid introduction portion 15 is distributed in the upper liquid distributor 35a, introduced into the upper gas-liquid contactor 33a, and then distributed again in the intermediate liquid distributor 35b. Thereafter, the descending liquid is introduced into the intermediate gas-liquid contactor 33b and the lower gas-liquid contactor 34 in this order to be subjected to distillation operations.

The results of simulations performed to check the effect of placing a gas disperser between upper and lower gas-liquid contactors will be described below. Meanwhile, in each simulation model, descending liquid is indicated by solid lines while ascending gas is indicated by broken lines.

Figure 5:
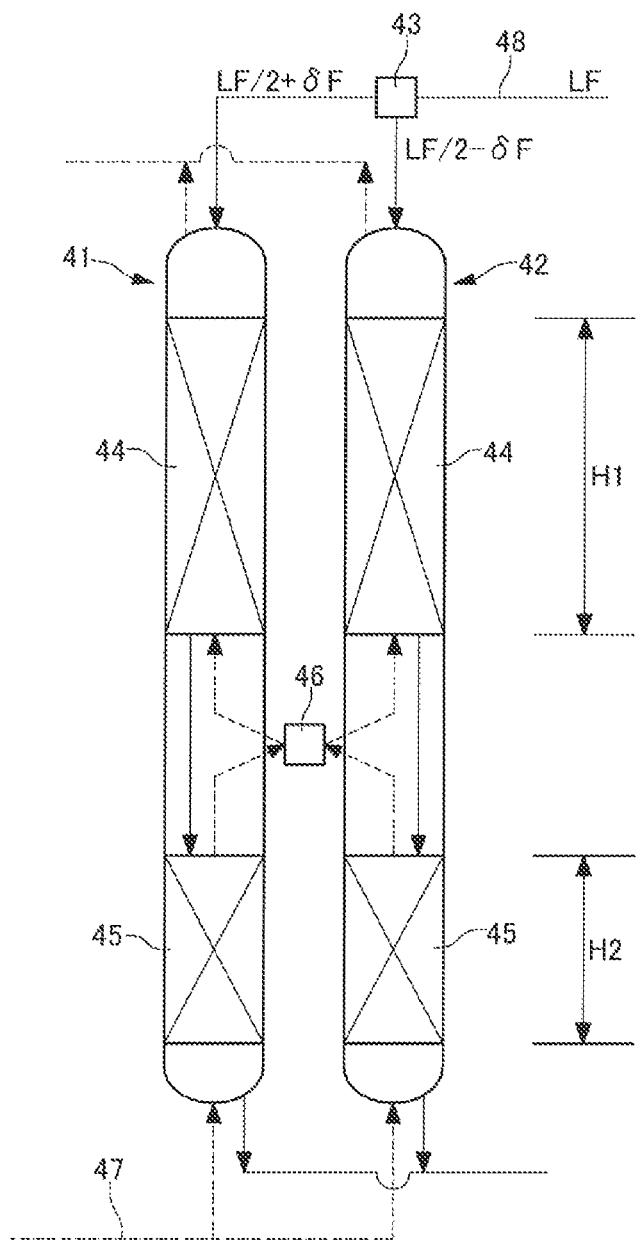
FIG. 5 is a simulation model corresponding to the first embodiment.

FIG. 5 is a simulation model of the case where the gas disperser 20 is provided between the upper gas-liquid contactor 17 and the lower gas-liquid contactor 18, as illustrated in the first embodiment. Descending liquid to be introduced into packed column models 41, 42 is introduced at a given ratio from a liquid distributor model 43 into the uppermost portions of the packed columns, and then reaches the lowermost portions of the packed column models 41, 42. Also, assuming that the total amount of descending liquid to be introduced into the packed column models 41, 42 is LF and the amount by which the amount of descending liquid is to be adjusted by the liquid distributor model 43 is $\delta F$, an amount LF1 of descending liquid to be introduced into the first packed column model 41 is $LF/2+\delta F$ while an amount LF2 of descending liquid to be introduced into the second packed column model 42 is $LF/2-\delta F$, and $\delta F/LF$ is the liquid maldistribution rate.

Figure 6:
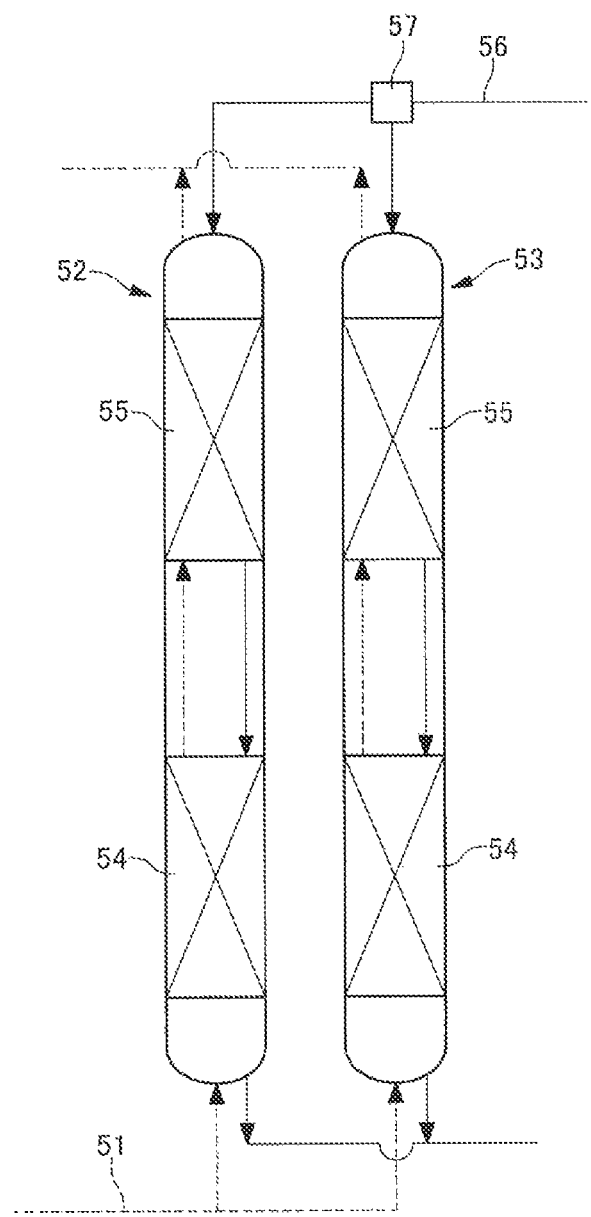
FIG. 6 is a simulation model of a conventional example provided with no gas disperser or intermediate liquid distributor.
Figure 16:
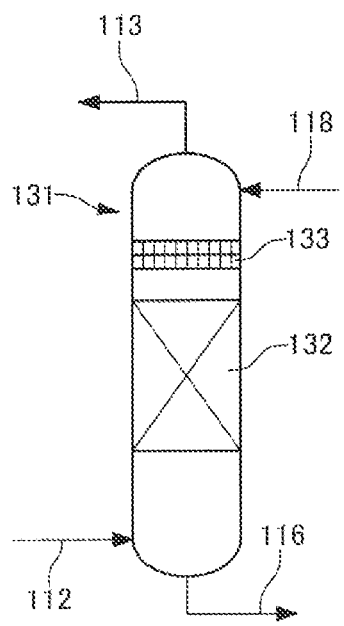
FIG. 16 is an explanatory diagram illustrating an example of a distillation column in which a single liquid distributor is disposed above a single gas-liquid contactor.

In this simulation model, a gas disperser model 46 corresponding to the gas disperser 20 is provided between upper gas-liquid contactor models 44 and lower gas-liquid contactor models 45. FIG. 6 is a simulation model of a conventional example provided with no gas disperser or intermediate liquid distributor, as illustrated in FIG. 16.

In the simulation model illustrated in FIG. 5, feed air to be introduced from a gas introduction portion 47 is introduced into the packed column models 41, 42 as ascending gases and subjected to distillation operations in the respective lower gas-liquid contactor models 45. Thereafter, the ascending gases are introduced into the gas disperser model to uniform the compositions of the ascending gases, introduced into the respective upper gas-liquid contactor models 44 to be subjected to distillation operations, and then rise to the uppermost portions of the respective packed column models 41, 42.

The descending liquid to be introduced from a liquid introduction portion 48 is introduced at a given ratio from the liquid distributor model 43, and then descends to the lowermost portions of the respective packed column models without their flow rates or compositions corrected at the intermediate portions.

In the simulation model illustrated in FIG. 6, feed air to be introduced from a gas introduction portion 51 is introduced into packed column models 52, 53 as ascending gases and then introduced from lower gas-liquid contactor models 54 directly into upper gas-liquid contactor models 55. These ascending gases rise to the uppermost portions of the respective packed column models 52, 53 without their flow rates or compositions corrected. Descending liquid to be introduced from a liquid introduction portion 56 is introduced at a given ratio from a liquid distributor model 57 into the uppermost portions of the packed column models 52, 53, and then descend to the lowermost portions of the respective packed column models 52, 53 without their flow rates or compositions corrected, as in the simulation model illustrated in FIG. 5.

Figure 7:
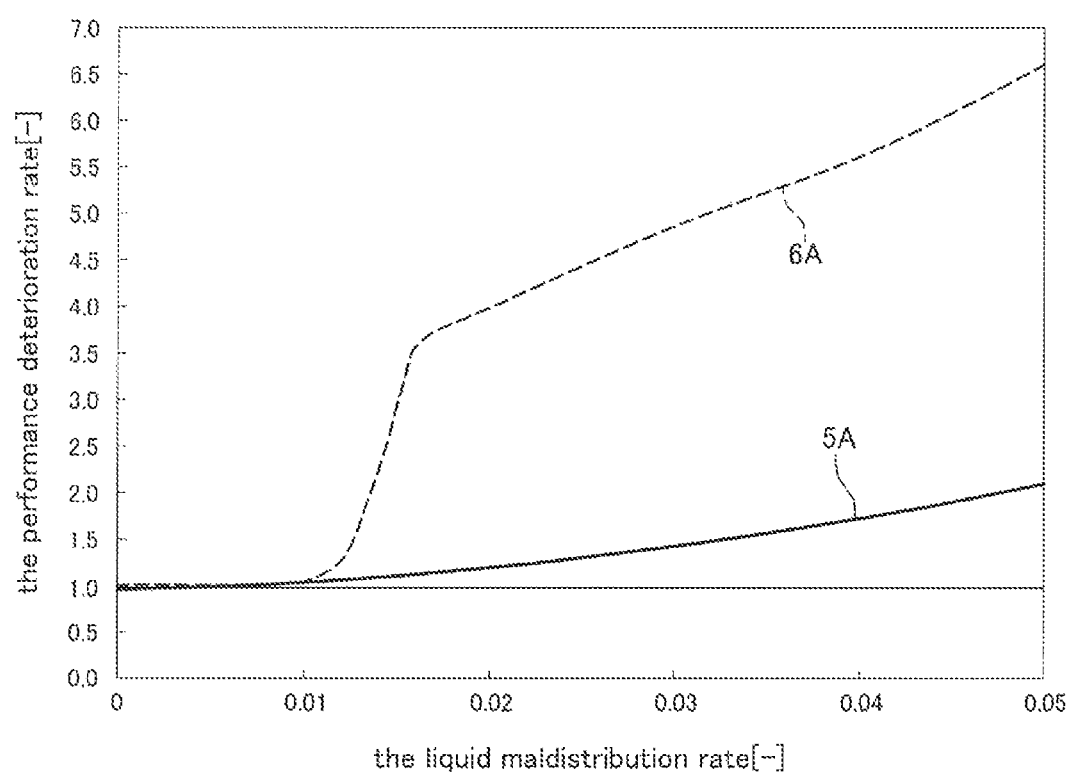
FIG. 7 is a graph illustrating the correlations between the liquid maldistribution rate and the performance deterioration rate obtained from the simulation models of FIGS. 5 and 6.

FIG. 7 illustrates the result of calculation of the performance deterioration rate versus the liquid maldistribution rate ($\delta F/LF$) using each of the simulation models illustrated in FIGS. 5 and 6. A performance deterioration rate 6A of the conventional example model illustrated in FIG. 6 sharply increases after a liquid maldistribution rate of 1%. This is because the compositions of the ascending gases in the packed column model 52, 53 become markedly different from each other. On the other hand, a performance deterioration rate 5A of the first embodiment model illustrated in FIG. 5, in which the gas disperser model 46 is placed to uniform the composition of the ascending gas, changes gently up to a liquid maldistribution rate of 5%, and performance deterioration hardly occurs up to a liquid maldistribution rate of 2%. This result indicates that placing a gas disperser to uniform the composition of the ascending gas can effectively suppress performance deterioration.

Figure 8:
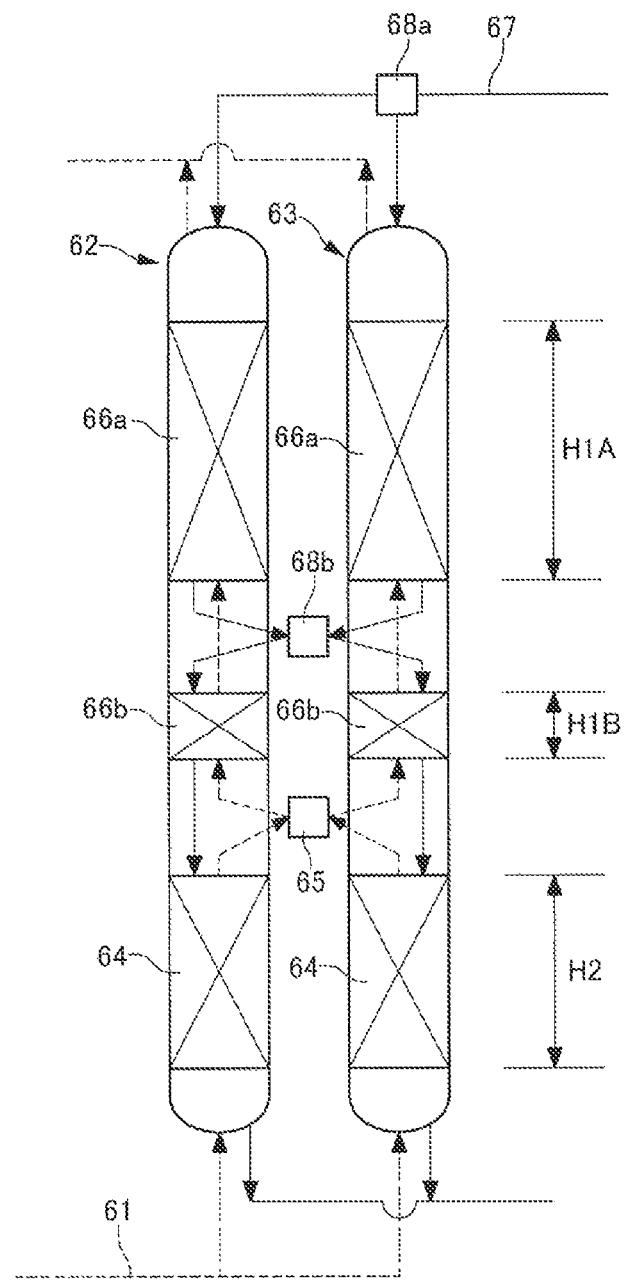
FIG. 8 is a simulation model corresponding to the second embodiment.

FIG. 8 is a simulation model of the case where a gas-liquid contactor is formed into the vertically divided upper gas-liquid contactor 33a, intermediate gas-liquid contactor 33b, and lower gas-liquid contactor 34, the upper liquid distributor 35a is provided above the upper gas-liquid contactor 33a, the intermediate liquid distributor 35b is provided between the upper gas-liquid contactor 33a and the intermediate gas-liquid contactor 33b, and the gas disperser 36 is provided between the intermediate gas-liquid contactor 33b and the lower gas-liquid contactor 34, as illustrated in the second embodiment.

In this simulation model, feed air to be introduced from a gas introduction portion 61 is introduced into lower portions of packed column models 62, 63 as ascending gases and subjected to distillation operations in respective lower gas-liquid contactor models 64. Thereafter, the ascending gases are introduced into a gas disperser model 65 to uniform the compositions of the ascending gases, and rise through intermediate gas-liquid contactor models 66b and upper gas-liquid contactor models 66a to the uppermost portions of the respective packed column models 62, 63.

On the other hand, descending liquid to be introduced from a liquid introduction portion 67 is introduced at a given ratio from an upper liquid distributor model 68a into upper portions of the packed column models 62, 63, subjected to distillation operations in upper gas-liquid contactor models 66a, and have their compositions uniformed in an intermediate liquid distributor model 68b. Thereafter, the resultant descending liquid is introduced at the same ratio as that by the upper liquid distributor model 68a into the intermediate gas-liquid contactor models 66b, introduced directly into the lower gas-liquid contactors 64, and descend to the lowermost portions of the packed column models 62, 63.

Figure 9:
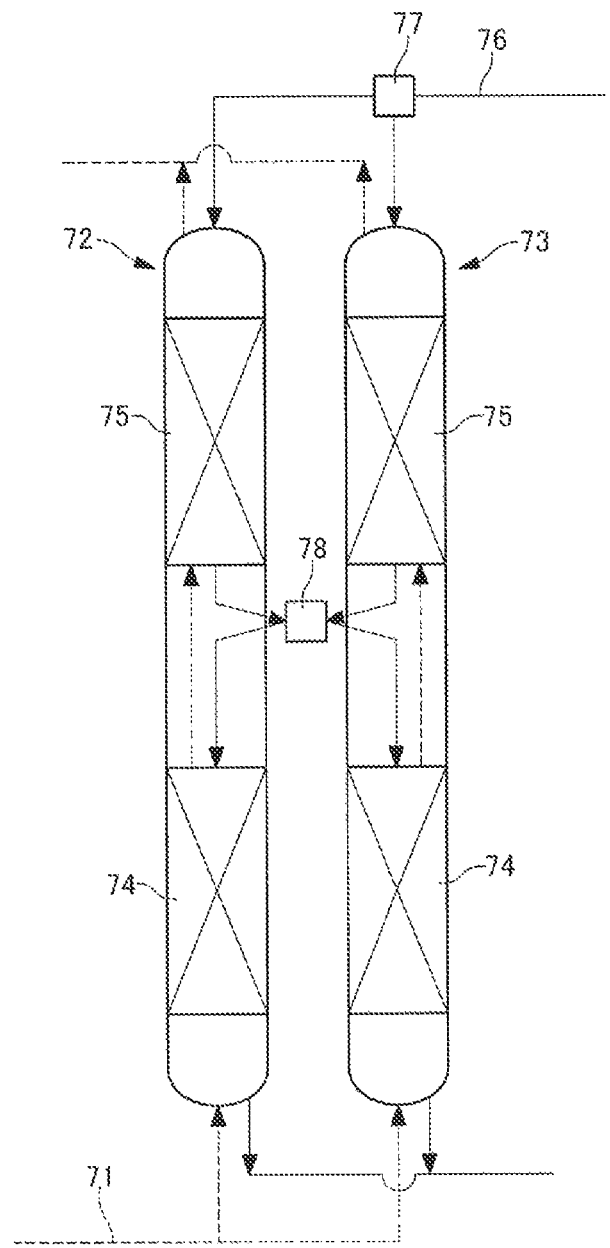
FIG. 9 is a simulation model corresponding to a packed column in which an intermediate liquid distributor is placed between an upper gas-liquid contactor and a lower gas-liquid contactor.
Figure 17:
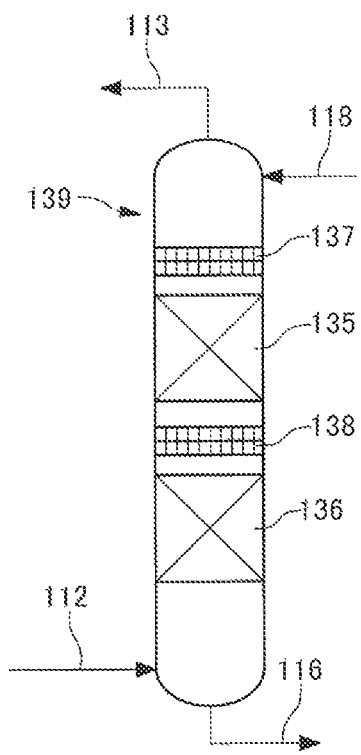
FIG. 17 is an explanatory diagram illustrating an example of a packed column in which an upper liquid distributor and an intermediate liquid distributor are provided respectively above vertically divided two gas-liquid contactors.

FIG. 9 is a simulation model of the packed column 139, in which the intermediate liquid distributor 138 is placed between the vertically divided two upper gas-liquid contactor 135 and lower gas-liquid contactor 136, as illustrated in the conventional example of FIG. 17.

In this simulation model, feed air to be introduced from a gas introduction portion 71 is introduced into packed column models 72, 73 as ascending gases and subjected to distillation operations in respective lower gas-liquid contactor models 74. Then, the ascending gases rise directly through upper gas-liquid contactor models 75 to the uppermost portions of the respective packed column models 72, 73 without their flow rates or compositions corrected.

On the other hand, descending liquid to be introduced from a liquid introduction portion 76 is introduced at a given ratio from an upper liquid distributor model 77 into the packed column models 72, 73, subjected to distillation operations in the upper gas-liquid contactor models 75, and have their compositions uniformed in an intermediate liquid distributor model 78. Then, the resultant descending liquid is introduced at the same ratio as that by the upper liquid distributor model 77 into the lower gas-liquid contactor models 74, and descends to the lowermost portions of the packed column models 72, 73.

Figure 10:
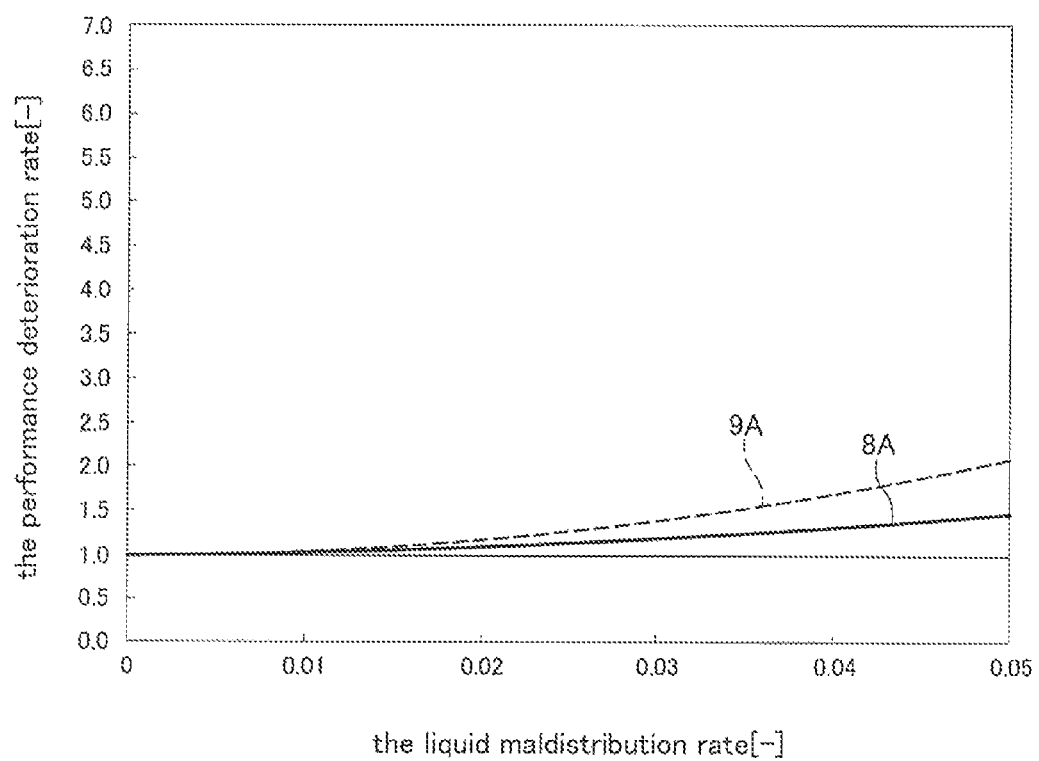
FIG. 10 is a graph illustrating the correlations between the liquid maldistribution rate and the performance deterioration rate obtained from the simulation models of FIGS. 8 and 9.

FIG. 10 illustrates the result of calculation of the performance deterioration rate versus the liquid maldistribution rate using each of the simulation models illustrated in FIGS. 8 and 9. A performance deterioration rate 9A of the simulation model illustrated in FIG. 9, in which no gas disperser is placed but an intermediate liquid distributor is placed, changes gently with increase in liquid maldistribution rate. The performance deterioration rate 9A is effective to some extent in reducing the rate of deterioration in distillation performance as compared to the performance deterioration rate 6A of the conventional example model, illustrated in FIG. 7. Nonetheless, a performance deterioration rate 8A of the simulation model illustrated in FIG. 8 indicates that a higher suppressing effect can be achieved by using both an intermediate liquid distributor and a gas disperser.

Figure 11:
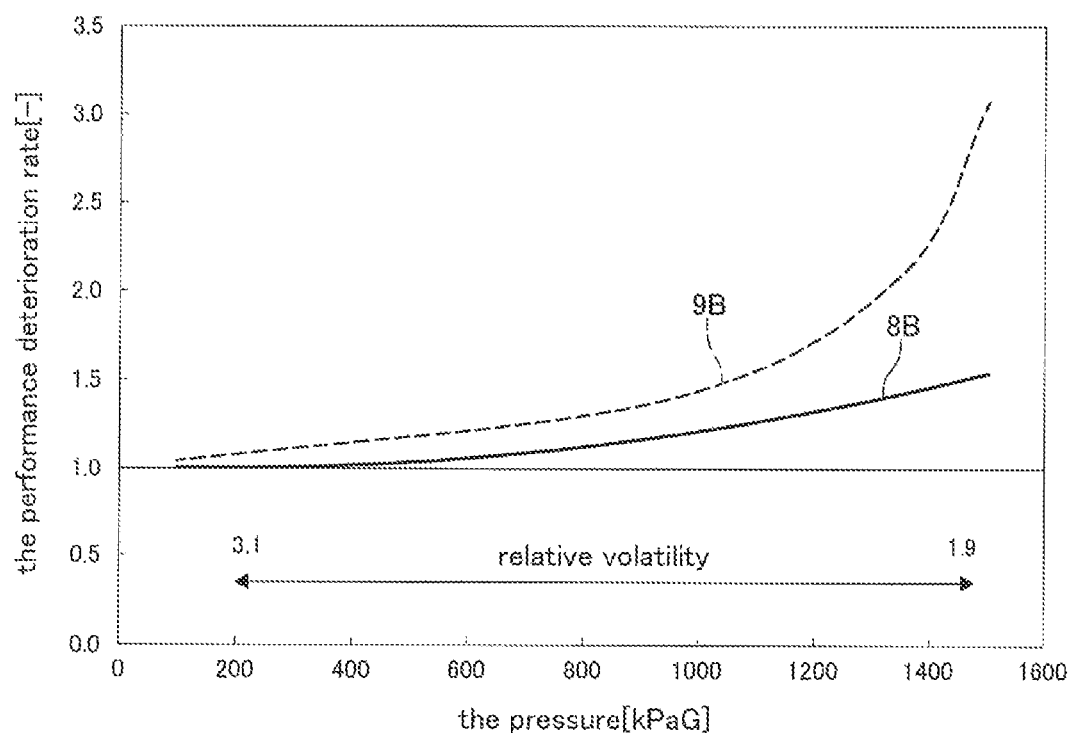
FIG. 11 is a graph illustrating the correlations between the operation pressure and the performance deterioration rate obtained from the simulation models of FIGS. 8 and 9.

Further, FIG. 11 illustrates the result of calculation of the performance deterioration rate versus the operation pressure using each of the simulation models illustrated in FIGS. 8 and 9 with the liquid maldistribution rate set to 3%. As for a performance deterioration rate 9B of the simulation model illustrated in FIG. 9, in which no gas disperser is placed, when the operation pressure is higher than or equal to 200 kPaG, the maldistribution of the ascending gases causes a great difference in composition between the ascending gases, and therefore the performance deterioration rate is markedly high. In contrast, a performance deterioration rate 8B of the simulation model illustrated in FIG. 8, in which a gas disperser is placed, indicates that the simulation model can suppress deterioration in distillation performance in the operation pressure range of 200 to 1500 kPaG, i.e., in the relative volatility range of 1.9 to 3.1.

Figure 12:
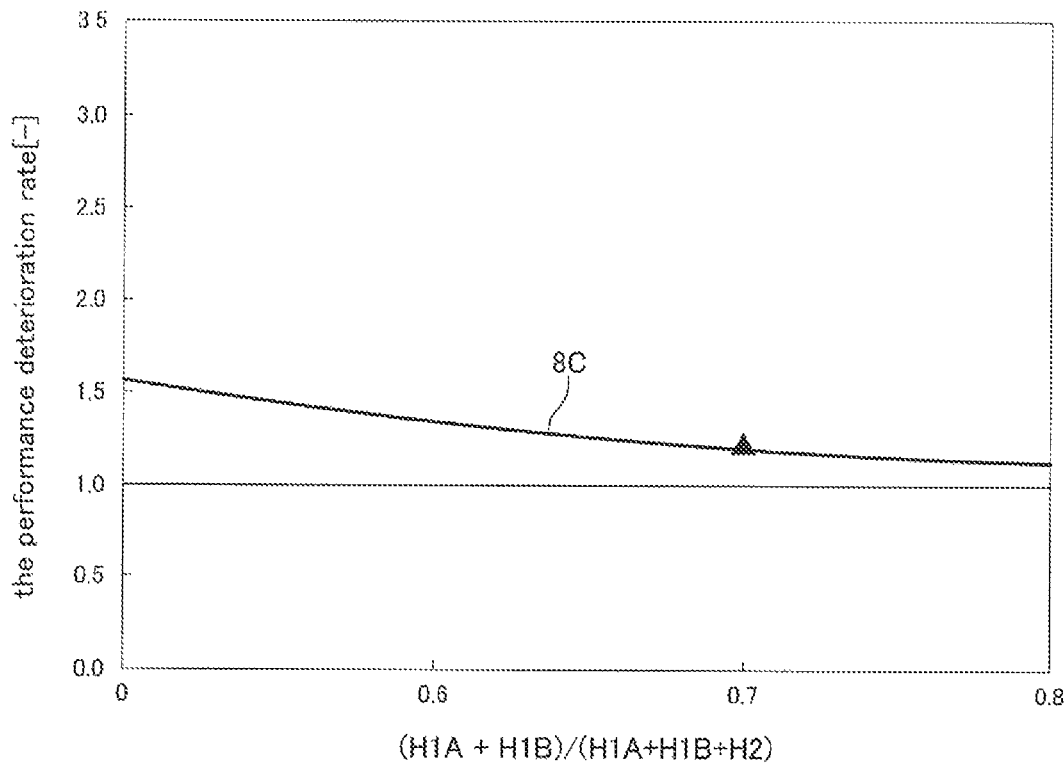
FIG. 12 is a graph illustrating the correlation between the performance deterioration rate and the ratio of the total height of each upper gas-liquid contactor model and each intermediate gas-liquid contactor model to the entire height of all gas-liquid contactor models obtained from the simulation model of FIG. 8.

Furthermore, FIG. 12 illustrates the result of consideration of the relationship between the position of placement of a gas disperser and the performance deterioration rate using the simulation model illustrated in FIG. 8. A performance deterioration rate 8C is calculated in a setting where in FIG. 8, the height of each upper gas-liquid contactor model 66a is H1A, the height of each intermediate gas-liquid contactor model 66b is H1B, the height of each lower gas-liquid contactor model 64 is H2, and the height H2 of the lower gas-liquid contactor model 64 is reduced while the entire height of all gas-liquid contactor models (H1A+H1B+H2) and the height H1A of the upper gas-liquid contactor model 66a are fixed, that is, the gas disperser 65 is shifted downward without changing the entire height. FIG. 12 illustrates the result.

This result indicates that the effect of suppressing performance deterioration is high when the ratio of the total height of the upper gas-liquid contactor model 66a and the intermediate gas-liquid contactor model 66b to the entire height of all gas-liquid contactor models is set to 0.5 or greater and in particular to 0.7 or greater. Note that although the performance deterioration rate is calculated in the setting where the entire height of all gas-liquid contactor models (H1A+ H1B+H2) and the height H1A of the upper gas-liquid contactor model 66a are fixed, the advantageous effect of the invention of the present application can be achieved regardless of which part is fixed in length. For example, the performance deterioration rate may be calculated with the entire height of all gas-liquid contactor models (H1A+H1B+ H2) and the height H1B of the intermediate gas-liquid contactor model 66b fixed.

Figure 13:
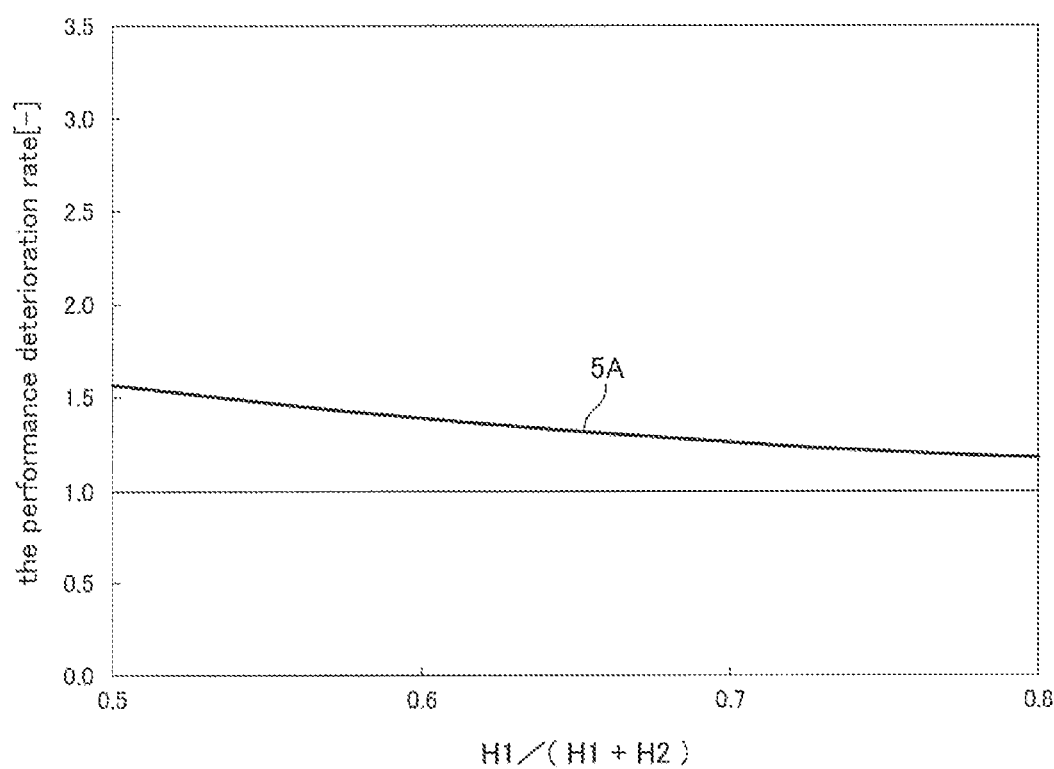
FIG. 13 is a graph illustrating the correlation between the performance deterioration rate and the ratio of the total height of each upper gas-liquid contactor model and each intermediate gas-liquid contactor model to the height of all gas-liquid contactor models obtained from the simulation model of FIG. 5.

Further, using the simulation model illustrated in FIG. 5, a performance deterioration rate 5A is calculated in a similar setting where the height of each upper gas-liquid contactor model 44 is H1, the height of each lower gas-liquid contactor model 45 is H2, and the height H2 of the lower gas-liquid contactor model 45 is reduced while the entire height of all gas-liquid contactor models (H1+H2) is fixed, that is, the gas disperser 46 is shifted downward without changing the entire height of all gas-liquid contactor models. As illustrated in FIG. 13, this result also indicates that the effect of suppressing performance deterioration is high when the ratio of the height H1 of the upper gas-liquid contactor model 44 to the entire height of all gas-liquid contactors is set to 0.5 or greater and preferably to 0.7 or greater. Note that although the performance deterioration rate is calculated in the setting where the entire height of all gas-liquid contactor models (H1+H2) is fixed, the advantageous effect of the invention of the present application can be achieved regardless of which part is fixed in length.

Figure 14:
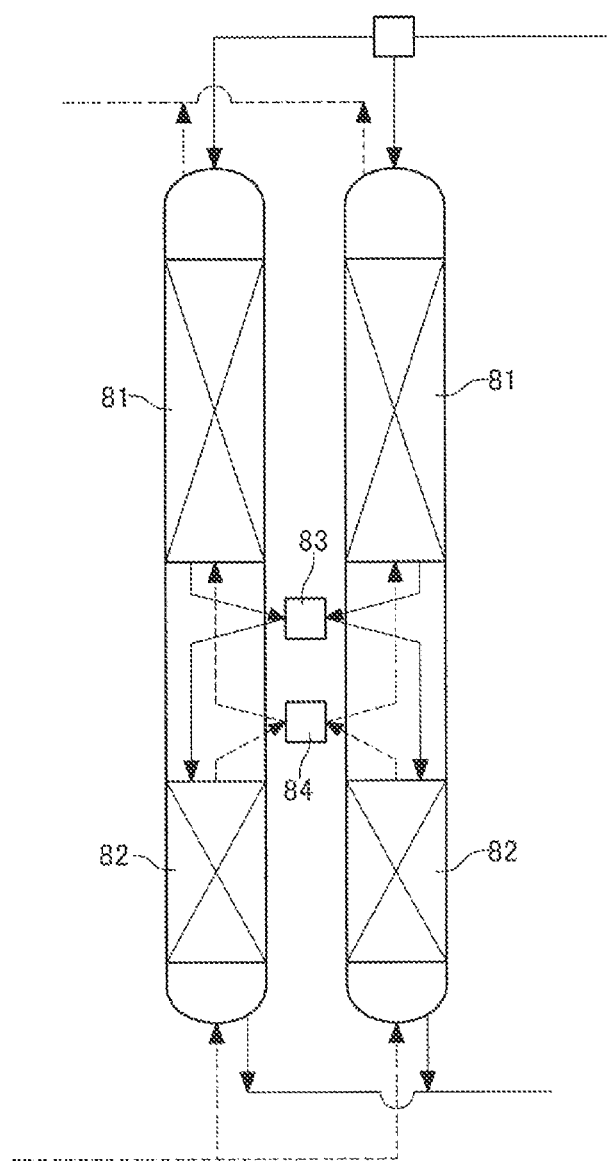
FIG. 14 is a simulation model in which an intermediate liquid distributor and a gas disperser are provided between upper gas-liquid contactors and lower gas-liquid contactors.
Figure 15:
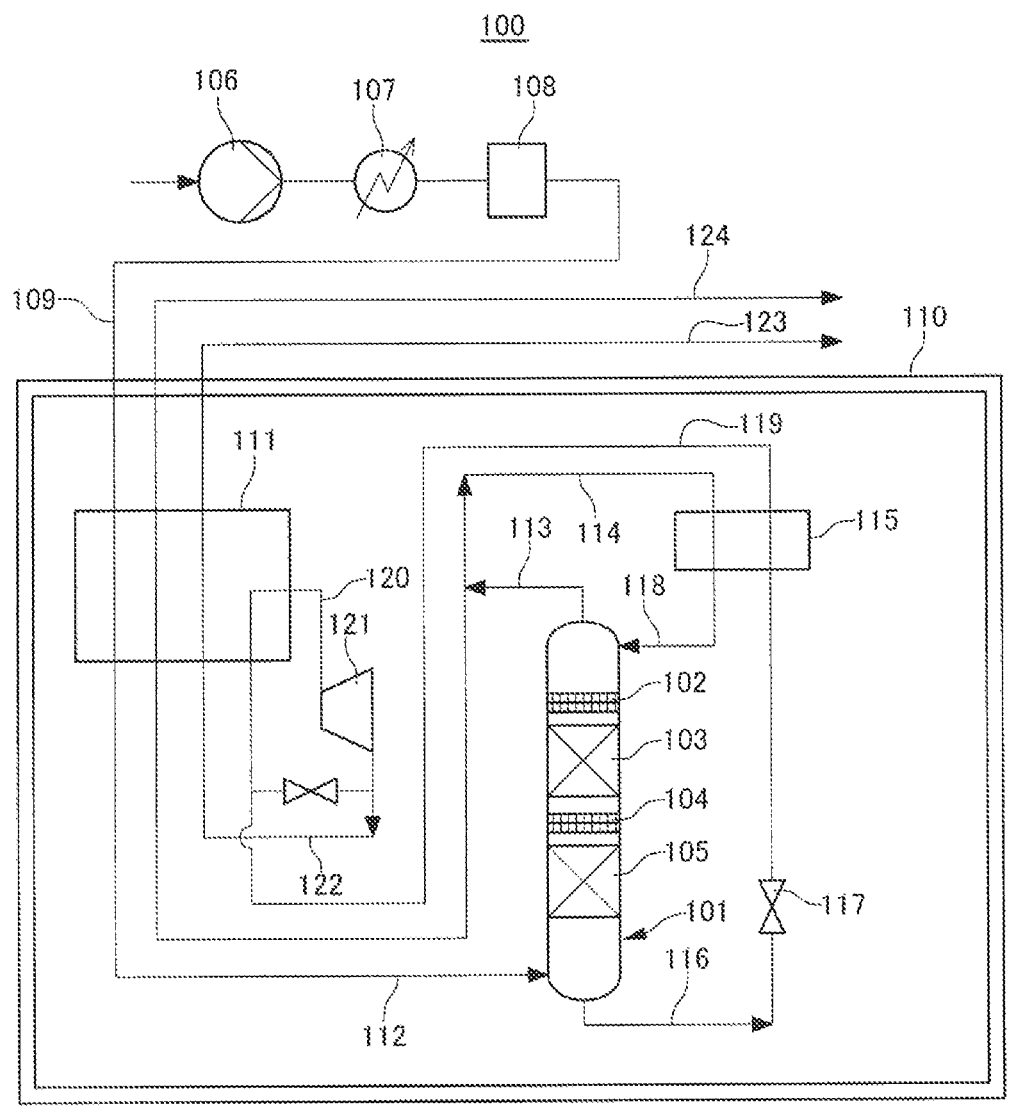
FIG. 15 is a system diagram illustrating the basic configuration of a nitrogen generator.

FIG. 14 is a simulation model in which an intermediate liquid distributor 83 and a gas disperser 84 are provided between upper gas-liquid contactors 81 and lower gas-liquid contactors 82. In the case of providing the intermediate liquid distributor 83 and the gas disperser 84 at the same position as above, a liquid distributor-gas disperser unit formed to integrate a liquid distributing function and a gas dispersing function can be provided. This result is illustrated by the black triangle in FIG. 12 (H1B is zero). The same result as the simulation model illustrated in FIG. 8 is obtained at the point where the ratio of (H1A+H1B) to (H1A+H1B+H2) is 0.7.

Note that each single gas-liquid contactor in the present invention refers to a portion including a gas-liquid contactor between an introduction portion or discharge portion for descending liquid and an introduction portion or discharge portion for ascending gas. The present invention is applicable to each gas-liquid contactor in a packed column including a plurality of gas-liquid introduction portions and gas-liquid discharge portions inside a tubular body. Moreover, the structure of the gas disperser may be any suitable structure.

REFERENCE SIGNS LIST 11 packed column
12 gas introduction portion
13 liquid discharge portion
14 gas discharge portion
15 liquid introduction portion
16 tubular body
17 upper gas-liquid contactor
18 lower gas-liquid contactor
19 liquid distributor
20 gas disperser
21 path
22 turn back portion
23 liquid receiving portion
24 bottom hole
31 packed column
32 tubular body
33a upper gas-liquid contactor
33b intermediate gas-liquid contactor
34 lower gas-liquid contactor
35a upper liquid distributor
35b intermediate liquid distributor
36 gas disperser
41, 42 packed column model
43 liquid distributor model
44 upper gas-liquid contactor model
45 lower gas-liquid contactor model
46 gas disperser model
47 gas introduction portion
48 liquid introduction portion
51 gas introduction portion
52, 53 packed column model
54 lower gas-liquid contactor model
55 upper gas-liquid contactor model
56 liquid introduction portion
57 liquid distributor model
61 gas introduction portion
62, 63 packed column model
64 lower gas-liquid contactor model
65 gas disperser model
66a upper gas-liquid contactor model
66b intermediate gas-liquid contactor model
67 liquid introduction portion
68a upper liquid distributor model
68b intermediate liquid distributor model
71 gas introduction portion
72, 73 packed column model
74 lower gas-liquid contactor model
75 upper gas-liquid contactor model
76 liquid introduction portion
77 upper liquid distributor model
78 intermediate liquid distributor model
81 upper gas-liquid contactor
82 lower gas-liquid contactor
83 intermediate liquid distributor
84 gas disperser
100 nitrogen generator
101 distillation column
102 upper liquid distributor
103 upper gas-liquid contactor
104 intermediate liquid distributor
105 lower gas-liquid contactor
106 air compressor
107 aftercooler
108 pre-treatment unit
109 purified air stream
110 cold box
111 main heat exchanger
112 gas introduction stream
113 gas discharge stream
114 condensation stream
115 condenser
116 liquid discharge stream
117 liquid-air pressure reducing valve
118 liquid introduction stream
119 low-temperature air stream
120 turbine inlet stream 121 expansion turbine
122 turbine outlet stream
123 waste gas stream
124 product nitrogen gas stream
131 distillation column
132 gas-liquid contactor
133 liquid distributor
135, 136 gas-liquid contactor
137 upper liquid distributor
138 intermediate liquid distributor
139 packed column

The invention claimed is:

1. A packed column comprising:
a gas-liquid contactor inside a tubular body; and
a liquid distributor in an uppermost portion, which causes descending liquid and ascending gas to contact each other in the gas-liquid contactor, characterized in that
the gas-liquid contactor is vertically divided into two parts to thereby form an upper gas-liquid contactor and a lower gas-liquid contactor, and
a gas disperser provided between the lower gas-liquid contactor and the upper gas-liquid contactor, the gas disperser uniformly dispersing a composition of the ascending gas rising from the lower gas-liquid contactor toward the upper gas-liquid contactor,
wherein a ratio of the upper gas-liquid contactor above the gas disperser to an entire height of all the gas-liquid contactors in the packed column is 0.7 or greater,
wherein the gas disperser has no fluid input or output to or from the outside of the packed column, and
wherein the packed column provides a relative volatility in a range of 1.9 to 3.1 under operation pressure in a range of 200 to 1500 kPaG.

2. A packed column comprising: a gas-liquid contactor inside a tubular body; and a liquid distributor in an uppermost portion, which causes descending liquid and ascending gas to contact each other in the gas-liquid contactor, characterized in that
the gas-liquid contactor is vertically divided into at least two parts to thereby form a plurality of gas-liquid contactors, and
at least one gas disperser provided at a position between a lower one of the gas-liquid contactors and an upper one of the gas-liquid contactors, the gas disperser uniformly dispersing a composition of the ascending gas rising from the lower gas-liquid contactor toward the upper gas-liquid contactor,
wherein a ratio of a total height of the upper gas-liquid contactor above an uppermost (highest) gas disperser of the at least one gas disperser to an entire height of all the gas-liquid contactors in the packed column is 0.7 or greater,
wherein the uppermost (highest) gas disperser has no fluid input or output to or from the outside of the packed column, and
wherein the packed column provides a relative volatility in a range of 1.9 to 3.1 under operation pressure in a range of 200 to 1500 kPaG.

3. The packed column according to claim 2, further comprising at least one intermediate liquid distributor that distributes the descending liquid again.

4. The packed column according to claim 3, wherein at least one gas disperser of the at least one gas disperser is formed integrally with the intermediate liquid distributor.

* * * * *